United States Patent [19]

Reil

[11] Patent Number: 4,952,130
[45] Date of Patent: Aug. 28, 1990

[54] APPARATUS FOR INJECTION-MOULDING A PLASTICS PORTION ON A PAPER TUBE USING A SUPPORT PORTION

[75] Inventor: Wilheim Reil, Bensheim, Fed. Rep. of Germany

[73] Assignee: Tetra Pak Finance & Trading S.A., Pully, Switzerland

[21] Appl. No.: 324,299

[22] Filed: Mar. 15, 1989

[30] Foreign Application Priority Data

Mar. 19, 1988 [DE] Fed. Rep. of Germany ....... 3809275

[51] Int. Cl.⁵ .................. B28B 21/56; B28B 23/18
[52] U.S. Cl. .................... 425/117; 249/91; 249/175; 264/278; 425/125; 425/577
[58] Field of Search .............. 249/83, 90, 91, 175, 249/DIG. 2; 264/278; 425/117, 125, 110, 577, 127

[56] References Cited

U.S. PATENT DOCUMENTS

| | | | |
|---|---|---|---|
| 2,100,985 | 11/1937 | Smally | 425/125 |
| 3,330,006 | 7/1967 | Jenkins | 425/125 |
| 3,829,055 | 8/1974 | Russ, Sr. | 249/91 |
| 3,991,146 | 11/1976 | Barrie | 264/278 |
| 4,123,214 | 10/1978 | Sutch | 249/91 |
| 4,336,009 | 6/1982 | Wolf | 249/83 |
| 4,580,962 | 4/1986 | Haas | 425/125 |
| 4,778,149 | 10/1988 | Savori et al. | 249/83 |
| 4,803,030 | 2/1989 | Kobayashi | 264/278 |
| 4,834,638 | 5/1989 | Miyahara et al. | 249/91 |

*Primary Examiner*—Jay H. Woo
*Assistant Examiner*—K. P. Nguyen
*Attorney, Agent, or Firm*—Paul and Paul

[57] ABSTRACT

Described is an apparatus for injection moulding a cover on to a plastics-coated tubular paper case (2), the apparatus including an injection-moulding core (4) and an outer mould embracing same. So that, in the case of a paper tube (2) of quadrangular cross-section, the flat walls of the tube do not suffer deflection and the location at which the cover is injection-moulded on to the tube is reliably controlled, it is provided in accordance with the invention that at least one support portion (6) is mounted on the edge face (10) in outstanding relationship beside the straight upper outer edge (11) of the injection-moulding core (4), against which support portion the edge of the paper tube (2) can be brought to bear.

5 Claims, 5 Drawing Sheets

4,952,130

APPARATUS FOR INJECTION-MOULDING A PLASTICS PORTION ON A PAPER TUBE USING A SUPPORT PORTION

The invention relates to an apparatus for injection-moulding a plastic portion on a plastics-coated paper tube, in particular a cover on the tubular paper casing of a liquid pack, comprising an injection-moulding core and an outer mould which at least partially embraces same.

BACKGROUND OF THE INVENTION

Field of the Invention

Injection-moulding apparatuses of that kind are already known and are described hereinafter in relation to a packaging machine in which paper which is coated on both sides with plastics material is drawn in the form of a web from a roll, cut up into individual portions and shaped by means of a longitudinal sealing seam to form a paper tube which is of round cross-section and which is pushed on to a mandrel, which is also of round cross-section, to act as an injection-moulding core, and which terminates with its edge in the injection-moulding position in the mould cavity of the tool (injection-moulding core and outer mould) in such a way that the heated liquid plastics material flows into the mould cavity and embraces the round edge of the paper tube in such a way as to close it off completely. In that way, in the known machine, the tubular paper casing is closed at one end by the cover for the cover comprises plastics materal without a carrier or backing material and for example also provides the pouring-out opening at the same time. The cover is anchored to the end edge of the tubular paper casing, is supported against same, and at the same time also seals off the open cut face of the end edge of the tubular paper casing. For, if a web of paper which is coated with plastics material on both sides is cut, then the cutting operation gives rise, along the cut edge which after the tubular casing has been formed becomes the circular end edge thereof, to an unprotected edge which is without any plastics coating and which must be protected from the ingress of liquid because otherwise the liquid penetrates into the paper fibres between the layers of plastics and destroys the pack from that cut edge. Therefore the known injection-moulding machine has such a mould cavity that the upper round end edge of the tubular paper casing does not terminate at the edge of the mould cavity but in the interior thereof, with the result that the plastics material which subsequently completely fills the mould cavity is not only applied to the free end edge which was the cut face, but is also applied on both sides beside same and thus closes off the upper edge of the paper tube to make it liquid-tight.

The packaging machine for producing liquid packs which are at least partly round in cross-section operated satisfactorily in that fashion. However, operators have now gone over to producing liquid packs of quadrangular cross-section using the same injection-moulding procedure. The difference in relation to the round pack, in terms of the tool used, is only that the mandrel is also of quadrangular cross-section, by virtue of forming four outer planes, and the tubular paper casing of a corresponding configuration is pushed on to the square mandrel, in a comparable position. It was thought otherwise that no changes in the injection-moulding procedure are involved.

Now however it has been found that the flat side wall of the quadrangular liquid pack has leakage points at the point of attachment of the cover. Initially, because of the tool portions being carefully manufactured, in particular in regard to the end regions of the injection-moulding core and also the outer mould, it was not possible to find the reasons for the flaws in regard to the leaking points, until, in the region of the flat edge of the paper tube, at a spacing from the four corners, some injection-moulded bead portions were detected on the outside, and portions of reduced thickness were found, on the inside of the liquid pack. Investigation then showed that one or other of the flat side walls of the liquid pack or the tubular paper casing had not been applied precisely against the flat wall of the outer mould, in the region of the upper edge of the tubular paper casing.

The invention was therefore based on the object of improving the injection-moulding apparatus of the kind set forth in the opening part of this specification, in such a way that, when dealing with a paper tube of quadrangular cross-section, the flat walls of the tube do not suffer from flexing and deflection and the injection moulding is of a reliable nature throughout.

While, in the case of the liquid pack of round cross-section, with the round tubular paper casing, there were adequate support forces by virtue of the use of the paper material and the round configuration thereof, so that the upper edge of the tubular paper casing was satisfactorily applied to the wall of the outer mould, which was in the form of a cylindrical surface, and the heated plastics material flowing into the mould was also unable to press that upper edge away from the wall of the mould, the investigation in accordance with the invention showed that such stiffening and holding forces were lost in the upper edge of the paper tube by virtue of its flat configuration between the corners thereof. In actual fact it was then found that, in the injection-moulding operation, the flat walls in the region of the upper edge flex and move into the mould cavity in any random fashion, wherever there is initially a free space which is first filled by the plastics material flowing into the mould. If for example the middle of a flat upper edge of the tubular paper casing is considered, it is possible to envisage that flat upper edge flexing away from the wall of the outer mould inwardly towards the injection-moulding core, with the result that plastics material flows into the space between the wall of the outer mould and the outside surface of the flat upper edge of the paper tube, and forms the above-described plastics bead which was initially found, at a location at which it is not only superfluous but is even undesirable for the reason that the amount of plastics material which is superfluous at that point is missing from the oppositely disposed inward side and therefore results in leakage points or at least a weakening of the anchoring forces by means of which the cover is subsequently to be secured to the paper casing. The smallest amount of load on the filled liquid pack then results in that weakened point breaking open.

SUMMARY OF THE INVENTION

In order to prevent the tube wall from flexing in that way, in order to attain the above-mentioned object, it is proposed in accordance with the invention that at least one support portion is mounted on the edge surface in outstanding relationship beside the straight upper outer edge of the injection-moulding core, against which support portion the edge of the paper tube can be brought to bear. In accordance with the invention the flat upper edge of the paper tube which, after it has been pushed on to the mandrel, projects by a portion above the upper outer edge of the mandrel, more specifically in order to extend into the mould cavity, is supported from the outside by the wall of the outer mould and now also from the inside, in accordance with the invention, by the support portion. In spite of the flat shape of the side wall of the novel liquid pack or the flat edge of the paper tube, that arrangement advantageously prevents flexing and deflection movements so that the position of the end face of the paper tube is reliably maintained throughout and weakening or even leakage points are eliminated in the finished liquid pack.

In that connection, in accordance with the invention it is desirable for the support portion to be in the form of a small plate which occupies a part of the cross-sectional profile between the injection-moulding core and the outer mould and for the outer end face of the support portion to be flat and to be disposed parallel to the wall of the paper tube in such a way that it can be applied against the flat edge of the paper tube. The end face and also the edge face of a mandrel or injection-moulding core is partially shaped by cutting machining so that straight edges and lines are preferred both in regard to recesses and also in regard to raised portions on such a workpiece. Making the support portion in the form of a small plate complies with that requirement and therefore facilitates manufacture. If consideration is given to the mould cavity between the injection-moulding core and the outer mould, which accommodates on the one hand the flat edge of the paper tube and on the other hand the plastics material which is injected into the mould, then the support portion which projects from the edge face fills a fraction of the cross-sectonal profile of that mould cavity, but in no way does it fill the entire cross-section of the mould cavity at the location of the support portion. More specifically, it is also necessary to provide, in the region of the support portion, that the free end face of the paper tube which has lost all its edge protection by virtue of the cutting operation is completely sealed off with plastics material when the cover is formed by injection moulding, and thus has plastics material injection-moulded around that edge. However the support portion may occupy such a large part of the cross-sectional profile of the mould cavity that, while ensuring the above-mentioned sealing effect (edge protection), there are no tensile forces or retaining forces between the upper edge of the paper tube and the cover, for the support portion occupies only a fraction of the entire edge surface so that the adjacent surfaces are sufficient to compensate for or carry the above-mentioned retaining forces which are not to be found only in the region of the support portion.

By virtue of the parallel arrangement of the outer end face of the support portion with respect to the wall of the tube or with respect to the outer plane of the injection-moulding core and by virtue of the flat configuration of the end face of the support portion, the upper edge of the paper tube can be applied directly against the support portion and can be supported thereagainst, as indicated by the name thereof.

It is also advantageous if, in accordance with the invention, the flat outer end face of the support portion leads into the outer plane of the injection-moulding core which is of quadrangular cross-section and is disposed flush therewith and, in the direction of the straight outer edge, is of a length of from 1/90th to 1/20th, preferably from 1/70th to 1/40th of the length of the outer edge. If for example the length of the outer edge is 70 mm, then it is already sufficient for the length of the flat end face of the support portion to be 1 mm, as considered in the direction of the straight outer edge, in order to ensure effective support for the flat edge of the paper tube. By virtue of the outer flat end face of the support portion being arranged flush with respect to the outer plane of the injection-moulding core and by virtue of the end face leading into that outer plane, it is possible for the paper tube to be pushed on to the injection-moulding core or pulled down therefrom, without involving any adverse effect, as if there were no support portions.

It is advantageous for a plurality of support portions to be fixed at the same level to the edge face of the injection-moulding core, for example in the case of an injection-moulding core in which the straight outer edge is 70 mm in length, there are three support portions, wherein the flat outer end face of each thereof is of a length of 1 mm, as considered in the direction of the straight outer edge. Overall that arrangement thus gives a support length of 3 mm which, by virtue of being preferably uniformly distributed over the straight outer edge of the injection-moulding core, reliably prevents the flat edge of the paper tube from flexing and deflecting.

Tests have shown that the support action is particularly advantageous when, in accordance with the invention, the flat outer end face of the support portion is rectangular and is of a height which is approximately equal to the spacing of the straight outer edge of the injection-moulding core from the first shoulder of the outer mould. The first shoulder of the outer mould, as referred to herein, delimits the mould cavity which is subsequently filled with plastics material, upwardly and downwardly in relation to the edge of the cover, when viewing for example downwardly on to the cover of the finished, closed liquid pack. The quadrangular end face is covered by the 'radial' or also 'horizontal' outside flange of the cover, which, for reasons of strength and providing a sealing effect, projects on the outside by a distance beyond the free end of the upper edge of the paper tube and is welded on the outside to the plastics layer on the paper tube.

If now, as mentioned above, the flat outer end face of the support portion is of the specified height, terminating approximately at the level of the above-mentioned first shoulder of the outer mould, then the arrangement ensures that the end edge of the paper tube is completely sealed off in a liquid-tight manner, as mentioned above, even though the tensile forces which occur when the filled liquid pack is subjected to pressure loadings are not sufficient at that location where previously the support portion had been disposed. However it has been shown that the adjacent regions carry the necessary tensile forces. In spite of the defined small recesses in the plastics moulding, the plastics moulding (which in fact forms the cover for the pack) is sufficiently firmly anchored to the edge of the paper tube.

In addition an advantageous configuration of the invention provides that the edge face which connects each of the four outer planes of the injection-moulding core to its end face is formed from at least two plane portions which intersect along a central edge and that the support portion is fixed at least to the lower plane portion which is disposed between the central edge and the upper outer edge. The upper outer edge of the injection-moulding core is referred to herein as the 'upper' outer edge because it is assumed that the mandrel or injection-moulding core is disposed in a substantially vertically upstanding position and therefore the end face thereof is assumed to be arranged at an 'upward' position. The generally flat end face which forms the inward side of the cover of the pack is therefore connected to the outer plane by way of the above-mentioned edge face. It will be appreciated in that connection that, in the case of a pack which is of quadrangular cross-section, four outer planes are disposed preferably at a right angle to each other and thus form the paper tube. Each outer plane of the paper tube and therewith also of the injection-moulding core therefore terminates towards the end face in the above-mentioned 'straight upper outer edge'. It is admittedly possible for the edge face between the outer plane of the injection-moulding core and its end face to be made up of one or more planes, but the edge face could also be formed by curved surfaces and the like, insofar only as the mould cavity is of a configuration around the upper edge of the paper tube such that the above-mentioned features and requirements are fulfilled, that is to say therefore the free cut edge, the upper end edge of the tube, has plastics material injected therearound to make it liquid-tight (edge protection), and shoulder-like injection-moulded bead portions, preferably applied to the inward side of the liquid pack, are welded to the edge of the paper tube, thus also ensuring that the plastics portion (cover of the pack) is mechanically retained on the paper tube (the tubular paper casing).

In accordance with the invention it is preferable, and advantageous from the production process point of view, for the edge face to comprise two plane portions which extend in strip-like form parallel to the upper outer edge, wherein the lower plane portion is disposed between the upper outer edge and a central edge and the upper strip-like plane portion extends between the central edge and the edge of the end face. As considered in the direction of the profile of the support portion, that is to say as viewed in the direction of the upper outer edge, the central edge, the upper outer edge and also the edge of the end face, which are all three straight, represent points, with the plane portions being represented by the connecting lines joining those points.

If those connecting lines between the points representing the edges are straight lines, then the surface portions of the entire so-called 'edge face' are planes; if the connecting lines are curved lines, then the surfaces are the above-mentioned curved surfaces. Planes are therefore preferred, in which connection it is possible for both plane portions once again to be disposed in one plane and then form a flat edge surface; in a preferred embodiment however the central edge is somewhat outside so that two plane portions which are disposed at different angles relative to each other form the edge face. The shape of the edge face of the injection-moulding core may preferably be that of the roof of a house, wherein the support portion according to the invention is attached in the manner of a dormer window-like structure to at least one of the two plane portions. The window region of the dormer window-like structure then corresponds to the flat outer end face of the support portion for that face is disposed parallel to and flush with the outer plane of the injection-moulding core. The rearward face which extends at an angle to the above-mentioned flat end face of the support portion and which corresponds to the roof region of the dormer window-like structure can extend as far as the edge of the end face of the core, but may also terminate in the region of the upper plane portion or it may even terminate as low as the central edge. While the outer end face of the support portion should be flat in order to give the appropriate support to the flat edge of the paper tube, the face of the support portion which corresponds to the roof part of the dormer window-like structure does not need to be flat. Except for the outer flat end face of the support portion the configuration thereof is not critical in other respects if the support portion does not occupy an excessively large volume so as not to weaken the above-mentioned mechanical tensile and compression forces of the plastics material which connects the cover to the paper tube of the subsequent liquid pack.

An advantageous embodiment of the support portions is in the form of a small plate. For example, a groove may be provided in the edge face of the injection-moulding core and/or over the edges thereof, by means of a simple cutting movement (planing machine), in such a way that a small plate of suitable shape can be lifted into and fixedly welded in the groove. In that way the support portion can be produced in an inexpensive, precise and reliable fashion, and secured to the injection-moulding core. In another method of manufacture the support portion could also be formed on the injection-moulding core by being shaped thereon or alternatively it could be welded on to the edge face without the provision of a groove in the core.

BRIEF DESCRIPTION OF THE DRAWING

Further advantages, features and possible uses of the present invention will be apparent from the following description of preferred embodiments in conjunction with the drawings in which.

DESCRIPTIONS OF THE PREFERRED EMBODIMENTS

Figure 1:
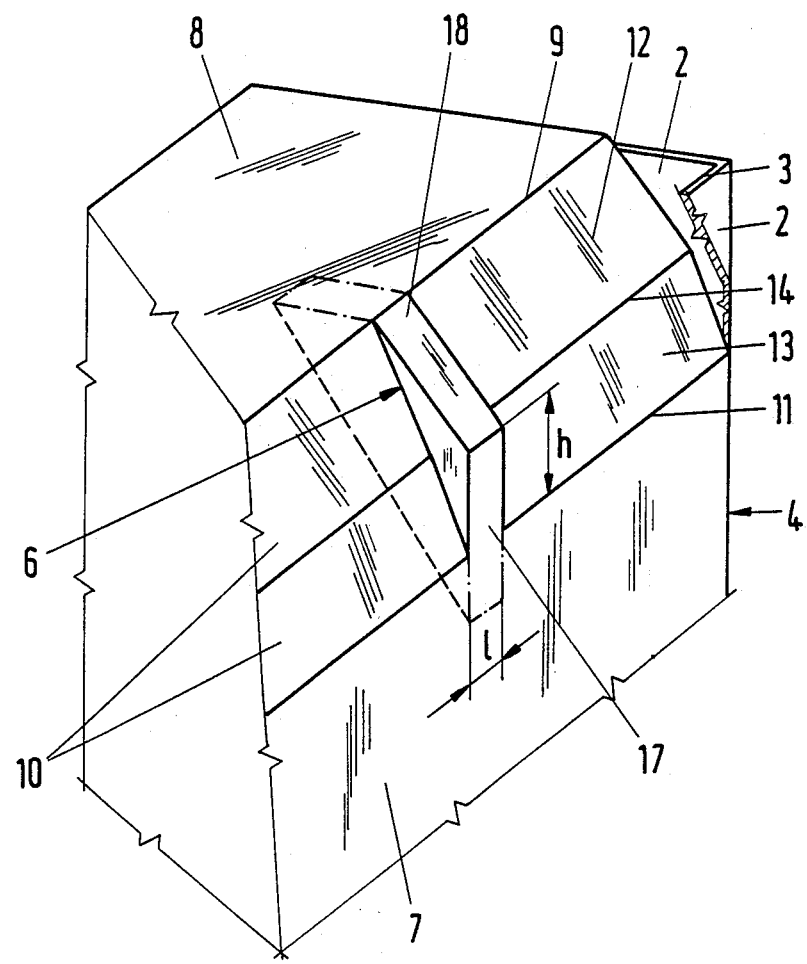
FIG. 1 is a diagrammatic perspective view in broken-away form of the upper end of an injection-moulding core with a broken-away part of the edge of the paper tube.
Figure 2:
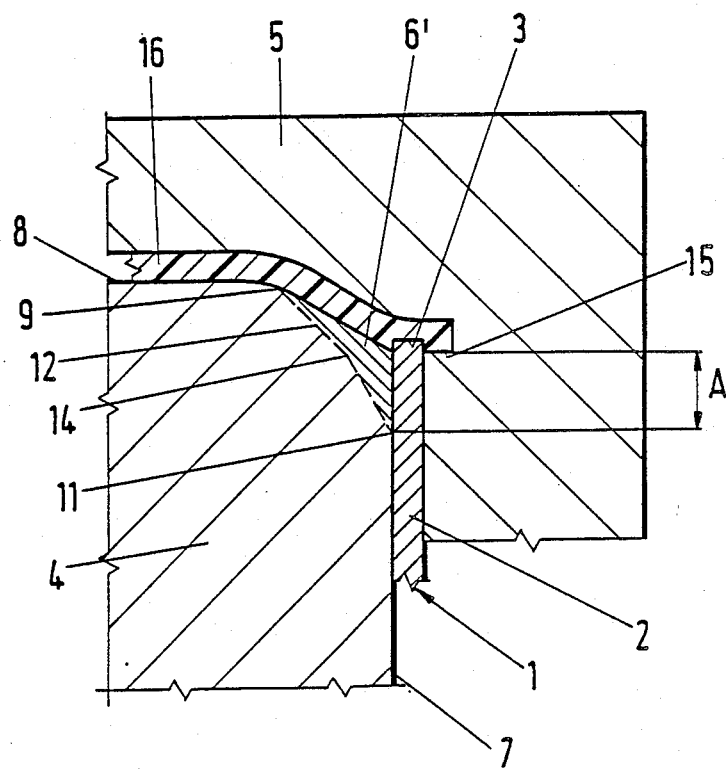
FIG. 2 is a diagrammatic broken-away view in vertical section with the mould cavity closed and with the cover injected, in the region of the support portion.

The reader can readily imagine a paper tube which is of a quadrangular and preferably square cross-section, the right-hand rearward end of which is shown in FIG. 1 in broken-away form, as a perspective view, and in cross-section in FIG. 2, as indicated at reference numeral 1. The flat edge of the paper tube is indicated by reference numeral 2 in FIGS. 1 and 2, with the upper end of the paper tube 1 being illustrated therein. Therefore the free upper end edge 3 (without edge protection in FIG. 1) can also be clearly seen in both FIGS. 1 and 2.

Reference numeral 4 denotes the injection-moulding core or mandrel which is of square cross-section, reference numeral 5 denotes the outer mould and reference numeral 6 denotes the support portion.

The injection-moulding core 4 has four outer planes of which only the front or right-hand outer plane 7 is shown in FIGS. 1 and 2. At the end or 'upwardly' the injection-moulding core 4 is delimited by the end face 8 which at the end edge 9 goes into the edge face which is generally identified by reference numeral 10 and has the straight upper outer edge 11 in common with the outer plane 7. When the edge face 10 comprises an upper plane portion 12 and a lower plane portion 13, they intersect at the central edge 14.

The outer mould 5 also has corresponding faces, edges and recesses. Of those, for the sake of understanding the invention, only FIG. 2 shows the first shoulder 15, at the level of which a broken line is extended towards the right, with a second broken line being disposed therebeneath at a spacing A therefrom, and extending through the upper outer edge 11. It will also be seen from FIG. 2 that the broken line which passes through the level of the first shoulder 15 is approximately at the level of the central edge 14.

The foregoing description substantially sets forth the configuration of the mould cavity between the injection-moulding core 4 and the outer mould 5, wherein the plastics portion 16 which forms for example the cover of a liquid pack is provided with cross hatching while the flat edge of the paper tube 2, like the side wall of the paper tube 1, in FIG. 2, only has simple hatching.

Figure 3:
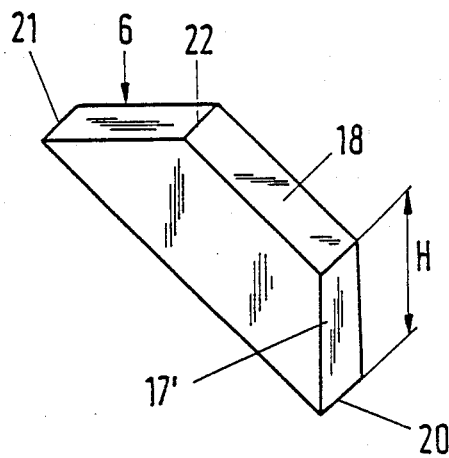
FIG. 3 is a perspective view of a small plate forming the support portion, of a specific design configuration.

The support portion 6 in the form of a small plate is shown in perspective view, in a specific embodiment, in the condition of being removed in FIG. 3 and in the condition of being installed in FIG. 1. The primary consideration in regard to the portion 6 is the flat outer end face 17, the area of which is determined by the length l (FIG. 1) and the height h (FIG. 1). The face 17' shown in FIG. 3 is larger than the flat face 17 for it is increased in length by the part which is let into the body of the injection-moulding core behind the outer plane 7 so that the overall height of the face 17' is identified by H. With the support portion 6 being of a corresponding configuration, H may be equal to h or larger than h, but is certainly not smaller than h.

FIG. 1 shows those parts of the support portion 6 which project out of the edge face 10 in the manner of a dormer window-like structure, shown in solid lines, while the remaining parts of the support portion 6, which are engaged into the injection-moulding core 4, are indicated by broken lines. The upper face 18 of the support portion 6, which corresponds to the roof surface of the dormer window-like structure, is flat in this embodiment and at the top goes into the end edge 9 in the direction of the end face 8.

In the cross-sectional view in FIG. 2, the cross-sectional profile of the support portion 6 is indicated by simple hatching and identified by reference numeral 6', wherein the direction of the simple hatching is at a different angle from the hatching indicating the edge 2 of the paper tube 1. FIG. 2 therefore shows the part under the plastics cover 16 which is occupied by the dormer window-like raised portion, in the region of the support portion 6. The length l of the support portion is from 1 to 2 mm, for example 2 mm. It is only in that region that the finished plastics cover 16 on the liquid pack is missing the volume 6' which is defined by the area 6' hatched in FIG. 2, multiplied by the length l. In the region of the support portion 6 therefore the arrangement has a cross-sectional profile with the plastics portion (cover of the liquid pack) 16 on the one hand and the upper edge 2 of the paper tube 1 on the other hand, as shown in solid lines in FIG. 2. Moreover, that volume 6' of plastics material is not missing but contributes to carrying away the mechanical compression, tensile and retaining forces so that the region shown by crossed hatching in FIG. 2 would have to be increased by the area 6'. The way in which the retaining forces are carried by way of the broken line in FIG. 2 to the point 11 can be clearly seen, with the upper edge 2 of the paper tube 1 therefore being fixedly anchored to the plastics portion 16.

While the size and position of the flat face 17 of the support portion 6, that is to say the dimension l (length measured in the direction of the outer edge 11) and the height h above the outer edges 11 are important, the parts of the support portion 6 which are shown in broken lines in FIG. 1 are variable. Thus for example, as shown in FIG. 3, the lower front edge 20 of the support portion 6 may be disposed at a somewhat higher level, thereby reducing the height H, while the rear lower edge 21 may be moved to a position closer to the rear upper edge 22 which in the view shown in FIG. 1 is in the end edge 9. The area between the edges 21 and 22 could possibly be entirely omitted if for example the support portion 6 is welded to the edge face 10 in the manner of a dormer window-like structure, without being engaged into the face 10.

Figure 4:
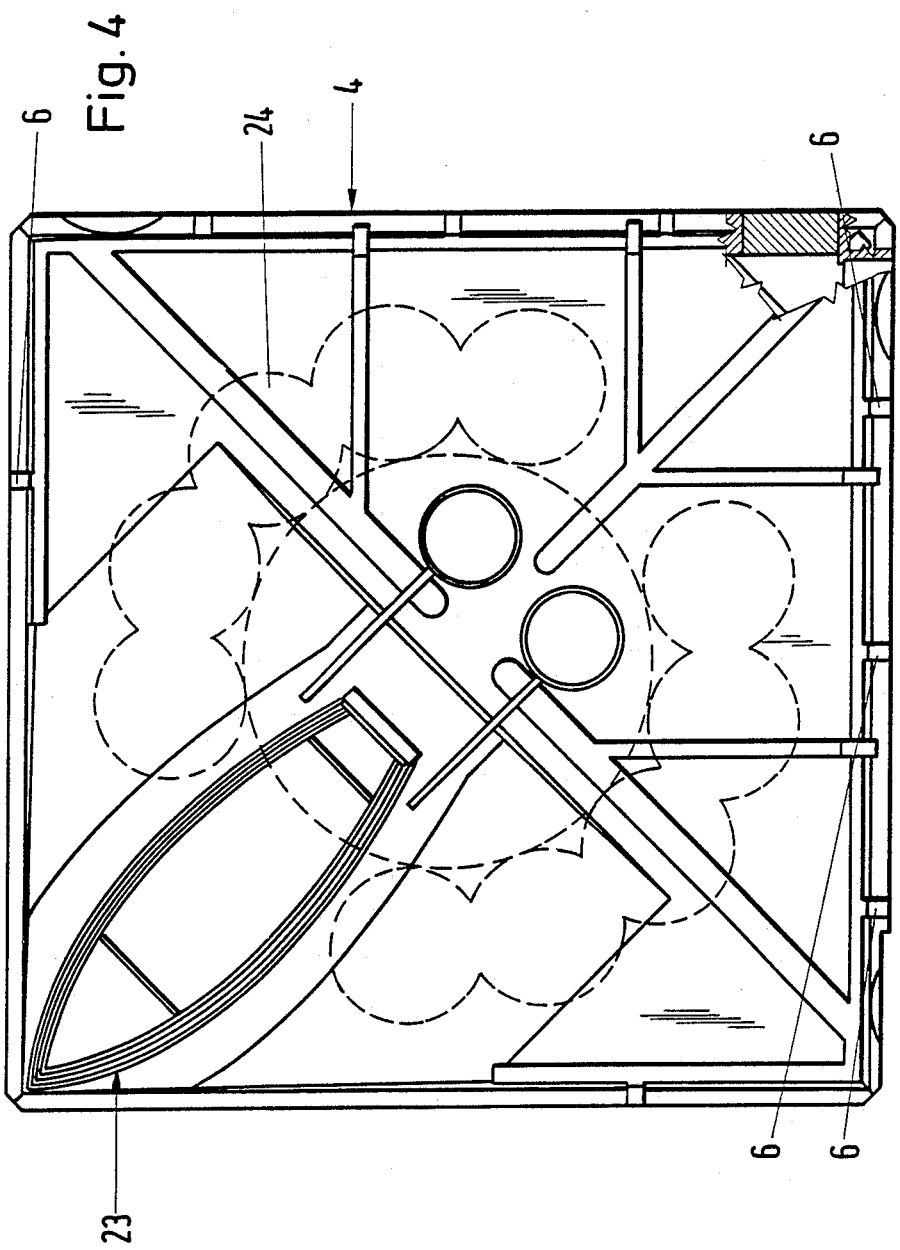
FIG. 4 is a plan view of the injection-moulding core, showing some flow passages for the plastics material and some support portions on the outside thereof.

The plan view in FIG. 4 on to the injection-moulding core 4 shows the pouring-out opening 23 in the upper region and at the adjacent edge at the top thereof a respective support portion 6, while three support portions 6 are provided along each of the two lower edges. FIG. 4 also shows the flow passages 24 for the liquid plastics material in the injection-moulding operation. In the regions of the support portion 6 there are small recesses in the plastics material bead which is arranged on the inward side of the subsequent finished pack.

Figure 5:
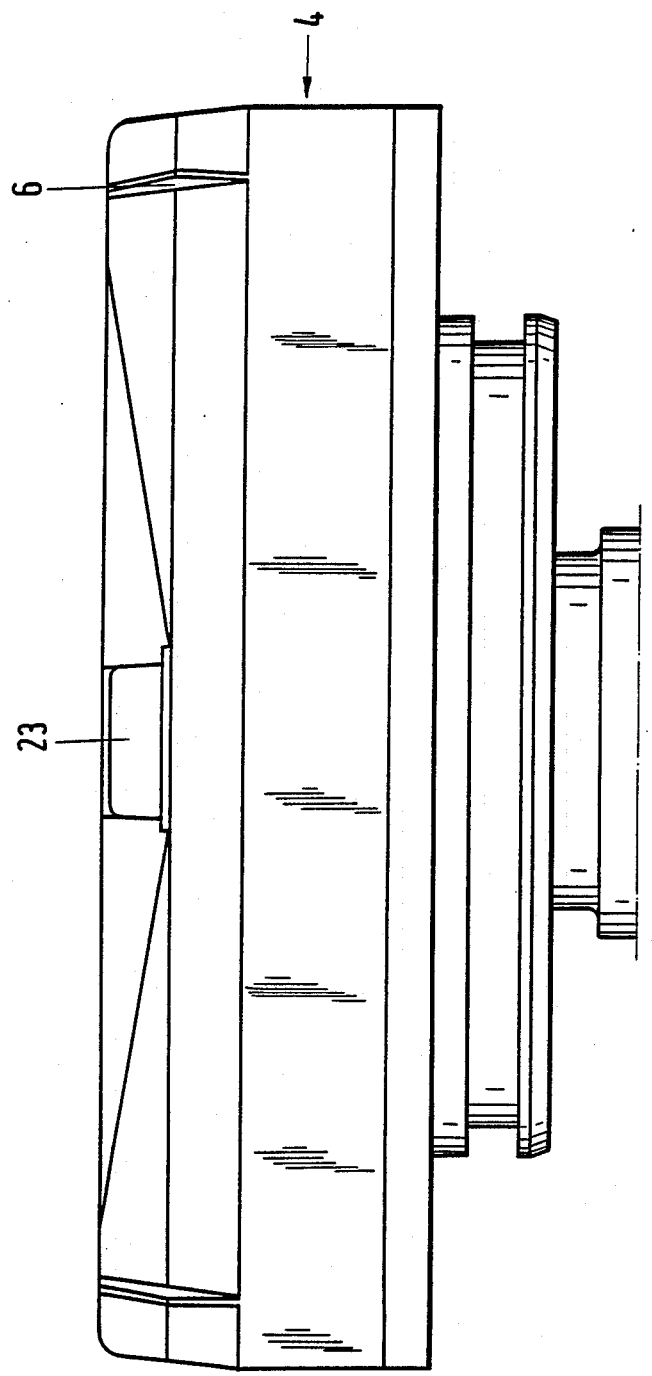
FIG. 5 is a side view of the injection-moulding core when looking at FIG. 4 in a downward direction, that is to say as viewed from the tip of the pouring-out opening.

FIG. 5 shows a side view of the head of the injection-moulding core when viewing downwardly in FIG. 4, so that the pouring-out arrangement 23 can be seen at the centre. Shown at a spacing to the right and to the left of the arrangement 23 are two support portions 6 which are shown in perspective in the view illustrated in FIG. 5.

Figure 6:
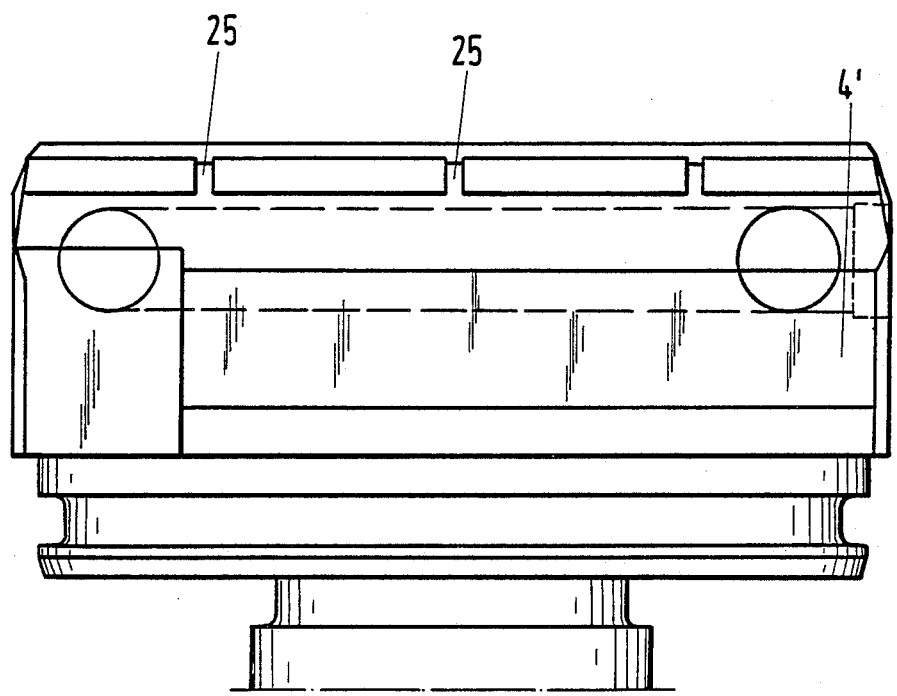
FIG. 6 is another side view of the upper injection-moulding core with grooves provided therein for the plate-like support portions.

Finally FIG. 6 shows the head of another embodiment of an injection-moulding core 4' in which three recesses 25 are disposed at the edge of the top thereof, in the form of grooves, being locations at which support portions are subsequently inserted and fixed in position.

It has already been mentioned above that the support portion can also be formed on the core or can be welded thereto. It should be emphasised once again at this point that a true preferred alternative is for the support portion to be formed on the core or machined out of one piece. Then, by means of cutting machining, the edge face 10 or the upper plane portion 12 and the lower plane portion 13 can thus be machined away in such a fashion that the support portion 6 remains.

In the one preferred embodiment described above, the support portion 6 is in the form of a small plate, as shown in FIG. 3 so that that plate-like support portion 6 is shown in FIG. 1 as being engaged more or less into the injection-moulding core 4.

In the embodiment which is also advantageous and which involves the arrangement being machined from one piece, it will be appreciated that there is no plate-like configuration, as shown in FIG. 3, and that then both the broken and the dash-dotted lines in FIG. 1, beside the support portion 6, are omitted, in which case the line representing the outer edge 11 must then be shown as a continuous line.

I claim:

1. Injection moulding apparatus for sealing an exposed end surface of a quadrangular tubular plastic coated paper casing with a plastic moulded portion, comprising an injection-moulding core and outer mould complementally configured so as to form a mould cavity in which the plastic moulded portion is sealed about the exposed end surface, wherein the injection moulding core is complementally configured so as to receive the casing and position the casing within the mold cavity so as to expose a quadrangular end surface of the casing to the sealing plastic portion, said injection moulding core having outer flat faces being configured to receive the casing, an end face exposed to the mould cavity and relieved surfaces formed between said end face and said outer flat faces, wherein said relieved surfaces have at least one support portion extending therefrom and affording a plane surface thereof for support of a portion of the corresponding portion of the quadrangular casing throughout the exposed length thereof within the mould cavity, and wherein said support portion has an outer end face of a length less than that to which the exposed end surface of the casing is exposed within the mould cavity.

2. Apparatus according to claim 1 wherein the support portion is in the form of a small plate which occupies a part of the cross-sectional profile between the injection-moulding core and the outer mould and that the outer end face of the support portion is flat and is disposed parallel to the casing wall in such a way that it supports an exposed plane surface of the casing against the outer mould so as to maintain the exposed end surface in moulding position.

3. Apparatus according to either claim 1 or 2 wherein the flat outer end face of the support portion leads into and is disposed flush with the outer flat faces of the injection-moulding core and in the direction of a straight outer edge formed by the relieved surface and the flat face is of a length of from 1/90th to 1/20th, of the length of the outer edge.

4. Apparatus according to claim 3 wherein the flat outside end face of the support portion is rectangular and is of a height which is approximately equal to the tubular length of the exposed end surface.

5. Apparatus according to claim 3 wherein the relieved surfaces which connect each of the outer flat faces of the injection-moulding core to the end face are each formed from at least two plane portions which intersect along a central edge and that the support portion is fixed at least at the lower plane portion which is disposed between the central edge and the straight outer edge of the outer flat face of the injection-moulding core.

* * * * *

UNITED STATES PATENT OFFICE
CERTIFICATE OF CORRECTION

Patent No. 4,952,130                    Dated August 28, 1990

Inventor(s) Wilhelm Reil

It is certified that error appears in the above-identified patent and that said Letters Patent is hereby corrected as shown below:

ON TITLE PAGE:

The inventor's first name "Wilheim" should be -- Wilhelm --.

Column 1, line 19, after the word "around" and before the word "edge" insert the word -- end --.

Column 1, line 33, after the word plastics "materal" should be -- material --.

Column 6, line 26, after the words shape can be "lifted" should be -- fitted --.

Signed and Sealed this

Twenty-fifth Day of February, 1992

Attest:

HARRY F. MANBECK, JR.

*Attesting Officer*               *Commissioner of Patents and Trademarks*